(12) United States Patent
Yoneda

(10) Patent No.: US 8,074,266 B2
(45) Date of Patent: Dec. 6, 2011

(54) MEMORY CARD, DATA EXCHANGE SYSTEM, AND DATA EXCHANGE METHOD

(75) Inventor: Takeshi Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1107 days.

(21) Appl. No.: 11/658,538

(22) PCT Filed: Aug. 20, 2004

(86) PCT No.: PCT/JP2004/011964
§ 371 (c)(1),
(2), (4) Date: Jan. 25, 2007

(87) PCT Pub. No.: WO2006/018890
PCT Pub. Date: Feb. 23, 2006

(65) Prior Publication Data
US 2008/0295180 A1    Nov. 27, 2008

(51) Int. Cl.
G06F 7/04 (2006.01)
(52) U.S. Cl. ............ 726/9; 713/156; 713/157; 713/171; 713/173; 713/175; 380/277; 711/100; 726/20
(58) Field of Classification Search ............ 726/27, 726/9, 20; 705/41; 380/277; 713/156–157, 713/171, 173, 175–177, 180; 711/100
See application file for complete search history.

(56) References Cited

U.S. PATENT DOCUMENTS

| 6,038,551 A | 3/2000 | Barlow et al. |
| 2004/0068631 A1 | 4/2004 | Ukeda et al. |

FOREIGN PATENT DOCUMENTS

| JP | 9-282393 A | 10/1997 |
| JP | 11-203439 A | 7/1999 |
| JP | 2000-285189 A | 10/2000 |
| JP | 2002-279062 A | 9/2002 |
| JP | 2003-108952 A | 4/2003 |
| JP | 2003-187194 A | 7/2003 |
| JP | 2004-21755 A | 1/2004 |
| JP | 2004-38270 A | 2/2004 |

OTHER PUBLICATIONS

The Supplementary European Search Report for EP 04 77 1925, mailed May 20, 2009.

*Primary Examiner* — Taghi Arani
*Assistant Examiner* — Angela Holmes
(74) *Attorney, Agent, or Firm* — Birch, Stewart, Kolasch & Birch, LLP.

(57) ABSTRACT

By enabling to write information which is readable only by an IC card owner on an IC card without inputting a PIN and to authenticate a creator of the written information and prevent falsification, it is guaranteed that data written on the IC card can be read only by the IC card owner, the creator of the written data can be specified, and the written data has not been falsified. A secure memory card 101 includes a card private key storing unit 208 storing a private key, a card certificate storing unit 202 storing a certificate of a public key which forms a pair with the private key, a certificate sending unit 201 sending the certificate to a PC 102, a private storing unit 203 which is readable/writable from the outside only when a correct PIN is input, a public storing unit 210 which is readable/writable from the outside without checking a PIN, a confidential data receiving unit 211 receiving confidential data from the PC 102, and so on.

8 Claims, 10 Drawing Sheets

MEMORY CARD, DATA EXCHANGE SYSTEM, AND DATA EXCHANGE METHOD

TECHNICAL FIELD

The present invention relates to a memory card, a data exchange system, and a data exchange method for secure data exchange.

BACKGROUND ART

It has been possible to use an IC card for an identification card, a membership card, or a patient's registration card. A writable/readable area can be included in an IC card. It has been possible to receive/send or share information by writing information on an IC card by a certain organization and by reading the information from the IC card by an IC card owner or another organization. The patent document 1 discloses a system in which a certain medical institution writes medical information on an IC card of a patient and another medical institution can refer to the medical information.
Patent Document 1: JP2000-285189

DISCLOSURE OF THE INVENTION

Problems to be Solved by the Invention

In order to verify that a user of an IC card is a correct owner of the IC card, in a system using an IC card such as an Automated Teller Machine (ATM), it is generally requested to input a PIN (Personal Identification Number) which only the IC card owner knows. However, in such a case, a system to which the IC card is inserted must be a reliable system that does not improperly accumulate nor use PIN information entered by users. Then, in a system using an IC card which requires to input a PIN, mutual authentication is generally done between the IC card and the system to which the IC card is inserted. To carry out the mutual authentication, it is necessary to safely share key information in a common key encryption system or to safely hold mutually a pair of a public key and a private key in a public key encryption system.

Further, in the system using an IC card which requires to input a PIN, when an IC card is handed to a certain organization and the organization tries to do a process which requires the PIN for the IC card, such process cannot be carried out only by an operator in the organization, but the PIN must be input by the IC card owner. As a result, there is constraint that the IC card owner must stand by for inputting the PIN beside the system of the organization.

The present invention aims to, by enabling to write information which is readable only by an IC card owner on an IC card without inputting a PIN and to authenticate a creator of the written information and prevent falsification, guarantee that data written on the IC card can be read only by the IC card owner, the creator of the written data can be specified, and the written data has not been falsified.

Means to Solve the Problems

A memory card according to the present invention includes:
a confidential data receiving unit receiving confidential data which is generated by encrypting the data by the writing apparatus from the writing apparatus;
a public storing unit storing the confidential data received by the confidential data receiving unit;
an authentication data receiving unit receiving authentication data sent by the reading apparatus;
an authentication data storing unit storing proper authentication data;
an authenticating unit performing authentication by comparing the authentication data received by the authentication data receiving unit with the proper authentication data stored by the authentication data storing unit;
a private storing unit storing data which is obtained by decrypting the confidential data stored by the public storing unit when the authentication performed by the authenticating unit succeeds; and
a card data sending unit sending the data stored by the private storing unit to the reading apparatus when the authentication performed by the authenticating unit succeeds.

The card data sending unit sends the confidential data stored by the public storing unit to the reading apparatus;
the memory card further comprises a card data receiving unit receiving data which is obtained by decrypting the confidential data sent by the card data sending unit by the reading apparatus from the reading apparatus; and
the private storing unit stores the data received by the card data receiving unit when the authentication performed by the authenticating unit succeeds.

The memory card further includes:
a card certificate storing unit storing a certificate including a first public key;
a certificate sending unit sending the certificate stored by the card certificate storing unit to the writing apparatus;
a card private key storing unit storing a first private key which forms a pair with the first public key;
a card common key receiving unit receiving a common key encrypted sent by the reading apparatus;
a common key decrypting unit decrypting the common key received by the card common key receiving unit using the first private key stored by the card private key storing unit; and
a card common key sending unit sending the common key decrypted by the common key decrypting unit to the reading apparatus.

The authentication data storing unit stores a personal identification number (PIN) as the proper authentication data.

The memory card further includes:
a data obtaining unit obtaining data obtained by decrypting the confidential data stored by the public storing unit, and
the private storing unit stores the data obtained by the data obtaining unit.

The memory card further includes:
a card certificate storing unit storing a certificate including a first public key;
a certificate sending unit sending the certificate stored by the card certificate storing unit to the writing apparatus;
a card private key storing unit storing a first private key which forms a pair with the first pubic key;
a signature data obtaining unit obtaining signature data encrypted from the confidential data stored by the public storing unit;
a common key obtaining unit obtaining a common key encrypted from the confidential data stored by the public storing unit;
a common key decrypting unit decrypting the common key obtained by the common key obtaining unit using the first private key stored by the card private key storing unit;
a signature data decrypting unit decrypting the signature data obtained by the signature data obtaining unit using the common key decrypted by the common key decrypting unit;

a digital signature obtaining unit obtaining a digital signature from the signature data decrypted by the signature data decrypting unit;

a certificate obtaining unit obtaining a certificate including a second public key from the signature data decrypted by the signature data decrypting unit;

a system certificate verifying unit verifying the certificate obtained by the certificate obtaining unit and obtaining the second public key included in the certificate; and a digital signature verifying unit verifying the digital signature obtained by the digital signature obtaining unit using the data obtained by the data obtaining unit and the second public key obtained by the system certificate verifying unit, and the data obtaining unit obtains data from the signature data decrypted by the signature data decrypting unit.

The memory card further includes:

a CA communicating unit obtaining a certificate from a certificate authority (CA) which issues a certificate, and the system certificate verifying unit verifies the certificate obtained by the certificate obtaining unit based on the certificate obtained by the CA communicating unit.

The authentication data storing unit stores a personal identification number (PIN) as the proper authentication data.

A data exchange system according to the present invention has a writing apparatus writing data, a reading apparatus reading the data, and a memory card receiving the data from the writing apparatus, storing the data received, and sending the data stored to the reading apparatus, the memory card is the abovementioned memory card, the writing apparatus comprises:

an inputting unit inputting the data;

a data storing unit storing the data input by the inputting unit;

a confidential data generating unit generating confidential data by encrypting the data stored by the data storing unit; and a confidential data sending unit sending the confidential data generated by the confidential data generating unit to the confidential data receiving unit, and the reading apparatus comprises:

a reading apparatus data receiving unit receiving the confidential data sent by the card data sending unit;

a data obtaining unit obtaining data which is obtained by decrypting the confidential data received by the reading apparatus data receiving unit;

an outputting unit outputting the data obtained by the data obtaining unit;

a reading apparatus data sending unit sending the data obtained by the data obtaining unit to the card data receiving unit;

an operating unit inputting authentication data; and an authentication data sending unit sending the authentication data input by the operating unit to the authentication data receiving unit.

A data exchange system according to the present invention has a writing apparatus writing data, a reading apparatus reading the data, and a memory card receiving the data from the writing apparatus, storing the data received, and sending the data stored to the reading apparatus, the memory card is the abovementioned memory card, the writing apparatus comprises:

an inputting unit inputting the data;

a data storing unit storing the data input by the inputting unit;

a certificate receiving unit receiving the certificate sent by the certificate sending unit;

a card certificate verifying unit verifying the certificate received by the certificate receiving unit and obtaining the first public key included in the certificate;

a system private key storing unit storing a second private key;

a digital signature generating unit generating a digital signature using the data stored by the data storing unit and the second private key stored by the system private key storing unit;

a system certificate storing unit storing a certificate including a second public key which forms a pair with the second private key;

a signature data generating unit generating signature data using the data stored by the data storing unit, the digital signature generated by the digital signature generating unit and the certificate stored by the system certificate storing unit;

a common key generating unit generating a common key;

a signature data encrypting unit encrypting the signature data generated by the signature data using the common key generated by the common key generating unit;

a common key encrypting unit encrypting the common key generated by the common key generating unit using the first public key obtained by the card certificate verifying unit;

a confidential data generating unit generating confidential data using the signature data encrypted by the signature encrypting unit and the common key encrypted by the common key encrypting unit; and a confidential data sending unit sending the confidential data generated by the confidential data generating unit to the confidential data receiving unit, and the reading apparatus comprises:

a reading apparatus data receiving unit receiving the confidential data sent by the card data sending unit;

a signature data obtaining unit obtaining the signature data encrypted from the confidential data received by the reading apparatus data receiving unit;

a common key obtaining unit obtaining the common key encrypted from the confidential data received by the reading apparatus data receiving unit;

a reading apparatus common key sending unit sending the common key encrypted obtained by the common key obtaining unit to the card common key receiving unit;

a reading apparatus common key receiving unit receiving the common key decrypted sent by the card common key sending unit;

a signature data decrypting unit decrypting the signature data obtained by the signature data obtaining unit using the common key received by the reading apparatus common key receiving unit;

a data obtaining unit obtaining data from the signature data decrypted by the signature data decrypting unit;

a digital signature obtaining unit obtaining a digital signature from the signature data decrypted by the signature data decrypting unit;

a certificate obtaining unit obtaining the certificate from the signature data decrypted by the signature data decrypting unit;

a system certificate verifying unit verifying the certificate obtained by the certificate obtaining unit and obtaining the second public key included in the certificate;

a digital signature verifying unit verifying the digital signature obtained by the digital signature obtaining unit using the data obtained by the data obtaining unit and the second public key obtained by the system certificate verifying unit;

an outputting unit outputting the data obtained by the data obtaining unit based on a result of verification carried out by the digital signature verifying unit;

a reading apparatus data sending unit sending the data obtained by the data obtaining unit to the card data receiving unit;

an operating unit inputting authentication data; and an authentication data sending unit sending the authentication data input by the operating unit to the authentication data receiving unit.

A data exchange system according to the present invention has a writing apparatus writing data, a reading apparatus reading the data, and a memory card receiving the data from the writing apparatus, storing the data received, and sending the data stored to the reading apparatus, the memory card is the abovementioned memory card, the writing apparatus comprises:

an inputting unit inputting the data;

a data storing unit storing the data input by the inputting unit;

a confidential data generating unit generating confidential data using the signature data encrypted by the signature encrypting unit and the common key encrypted by the common key encrypting unit; and a confidential data sending unit sending the confidential data generated by the confidential data generating unit to the confidential data receiving unit, and the reading apparatus comprises:

an operating unit inputting authentication data;

an authentication data sending unit sending the authentication data input by the operating unit to the authentication data receiving unit;

a reading apparatus data receiving unit receiving the data sent by the card data sending unit; and an outputting unit outputting the data received by the reading apparatus data receiving unit.

A data exchange system according to the present invention has a writing apparatus writing data, a reading apparatus reading the data, and a memory card receiving the data from the writing apparatus, storing the data received, and sending the data stored to the reading apparatus, the memory card is the abovementioned memory card, the writing apparatus comprises:

an inputting unit inputting the data;

a data storing unit storing the data input by the inputting unit;

a certificate receiving unit receiving the certificate sent by the certificate sending unit;

a card certificate verifying unit verifying the certificate received by the certificate receiving unit and obtaining the first public key included in the certificate;

a system private key storing unit storing a second private key;

a digital signature generating unit generating a digital signature using the data stored by the data storing unit and the second private key stored by the system private key storing unit;

a system certificate storing unit storing the certificate including the second public key which forms a pair with the second private key;

a signature data generating unit generating signature data using the data stored by the data storing unit, the digital signature generated by the digital signature generating unit and the certificate stored by the system certificate storing unit;

a common key generating unit generating a common key;

a signature data encrypting unit encrypting the signature data generated by the signature data using the common key generated by the common key generating unit;

a common key encrypting unit encrypting the common key generated by the common key generating unit using the first public key obtained by the card certificate verifying unit;

a confidential data generating unit generating confidential data using the signature data encrypted by the signature data encrypting unit and the common key encrypted by the common key encrypting unit; and a confidential data sending unit sending the confidential data generated by the confidential data generating unit to the confidential data receiving unit, and the reading apparatus comprises:

an operating unit inputting authentication data;

an authentication data sending unit sending the authentication data input by the operating unit to the authentication data receiving unit;

a reading apparatus data receiving unit receiving the data sent by the card data sending unit; and an outputting unit outputting the data received by the reading apparatus data receiving unit.

A data exchange method according to the present invention includes:

by the memory card:

receiving confidential data which is generated by encrypting the data by the writing apparatus from the writing apparatus;

storing the confidential data received;

sending the confidential data stored to the reading apparatus;

receiving data which is obtained by the reading apparatus by decrypting the confidential data sent, from the reading apparatus;

receiving authentication data sent by the reading apparatus;

storing proper authentication data;

performing authentication by comparing the authentication data received with the proper authentication data stored;

when the authentication succeeds, storing the data received from the reading apparatus; and when the authentication succeeds, sending the data stored to the reading apparatus, and by the writing apparatus:

inputting the data;

storing the data input;

generating confidential data by encrypting the data stored; and sending the confidential data generated to the memory card;

by the reading apparatus:

receiving the confidential data sent by the memory card;

obtaining data obtained by decrypting the confidential data received;

outputting the data obtained;

sending the data obtained to the memory card;

inputting the authentication data; and sending the authentication data input to the memory card.

The method further includes:

by the memory card:

storing a certificate including a first public key;

sending the certificate stored to the writing apparatus;

storing a first private key which forms a pair with the first public key;

receiving a common key encrypted sent by the reading apparatus;

decrypting the common key received using the first private key stored; and sending the common key decrypted to the reading apparatus;

by the writing apparatus:

receiving the certificate sent by the memory card;

verifying the certificate received and obtaining the first public key included in the certificate;

storing a second private key;

generating a digital signature using the data and the second private key stored;

storing a certificate including a second public key which forms a pair with the second private key, generating signature data using the data stored, the digital signature generated, and the certificate including the second public key stored;

generating a common key;

encrypting the signature data generated using the common key generated;

a common key encrypting unit encrypting the common key generated using the first public key obtained; and generating confidential data using the signature data and the common key encrypted, and by the reading apparatus:

obtaining the signature data encrypted from the confidential data received;

obtaining the common key encrypted from the confidential data received;

sending the common key encrypted obtained to the memory card;

receiving the common key decrypted sent by the memory card;

decrypting the signature data obtained using the common key received;

obtaining the data from the signature data decrypted;

obtaining the digital signature from the signature data decrypted;

obtaining the certificate from the signature data decrypted;

verifying the certificate obtained and obtaining the second public key included in the certificate;

verifying the digital signature obtained using the data and the second public key obtained; and outputting the data obtained based on a result of verification.

A data exchange method according to the present invention includes:

by the memory card:

receiving confidential data which is generated by encrypting the data by the writing apparatus from the writing apparatus;

storing the confidential data received;

obtaining the data obtained by decrypting the confidential data stored;

storing the data obtained;

receiving authentication data sent by the reading apparatus;

storing proper authentication data;

performing authentication by comparing the authentication data received with the proper authentication data stored; and when the authentication succeeds, sending the data stored to the reading apparatus, by the writing apparatus:

inputting the data;

storing the data input;

generating confidential data by encrypting the data stored; and sending the confidential data generated to the memory card, and by the reading apparatus:

inputting the authentication data;

sending the authentication data input to the memory card;

receiving the data sent by the memory card; and outputting the data received.

The method further includes:

by the memory card:

storing a certificate including a first public key;

sending the certificate stored to the writing apparatus;

storing a first private key which forms a pair with the first public key;

obtaining the data from the signature data decrypted;

obtaining signature data encrypted from the confidential data stored;

obtaining a common key encrypted from the confidential data stored;

decrypting the common key obtained using the first private key stored;

decrypting the signature data obtained using the common key decrypted;

obtaining a digital signature from the signature data decrypted;

obtaining a certificate including a second public key from the signature data decrypted;

verifying the certificate obtained and obtaining the second public key included in the certificate; and verifying the digital signature obtained using the data and the second public key obtained, by the writing apparatus:

inputting the data;

storing the data input;

receiving the certificate sent by the memory card;

verifying the certificate received and obtaining the first public key included in the certificate;

storing a second private key;

generating a digital signature using the data and the second private key stored;

storing the certificate including the second public key which forms a pair with the second private key;

generating signature data using the data stored, the digital signature generated, and the certificate including the second public key stored;

generating a common key;

encrypting the signature data generated using the common key generated;

encrypting the common key generated using the first public key obtained;

generating confidential data using the signature data and the common key encrypted; and sending the confidential data generated to the memory card, and by the reading apparatus:

inputting the authentication data;

sending the authentication data input to the memory card;

receiving the data sent by the memory card; and outputting the data received.

Effect of the Invention

The present invention enables to write information which is readable only by an IC card owner on an IC card without inputting a PIN and to authenticate a creator of the written information and prevent falsification. Further, it is possible to guarantee that data written on the IC card can be read only by the IC card owner, the creator of the written data can be specified, and the written data has not been falsified.

PREFERRED EMBODIMENTS FOR CARRYING OUT THE INVENTION

Hereinafter, an embodiment of the invention will be explained based on figures. Here, a memory card pertinent to the first and second embodiments discussed below is a memory card having an encryption authentication function, and the card is called as a secure memory card. However, it is also applicable to an IC card, etc. having similar function to the memory card.

Further, in the first and second embodiments discussed below, although an explanation will be done using a PC (personal computer) as an example of a writing apparatus, it is also applicable to other apparatuses if such apparatuses have a function to write data on memory cards. Similarly, in the first and second embodiments discussed below, although an explanation will be done using a mobile phone as an example of a reading apparatus, it is also applicable to other apparatuses if such apparatuses have a function to read data from memory cards.

Embodiment 1

The present embodiment enables to safely provide a user with medication instruction using a secure memory card at a pharmacy by using a certificate stored in the secure memory card and a public storing unit which is writable without PIN authentication for the secure memory card.

FIG. 1 shows an outline of exchange between a user and a pharmacy as described below.

(1) A user 104 supplies a prescription issued by a hospital and a secure memory card 101 which has been inserted in a mobile phone 103 at a reception of a pharmacy.

(2) A pharmacist 105 writes a medication instruction on the secure memory card 101.

(3) The user 104 sees the contents of the medication instruction by installing the secure memory card 101 to the mobile phone 103.

The user 104 installs the secure memory card 101 to the mobile phone 103. Entering to the pharmacy, the user 104 gives the paper prescription and the secure memory card 101 ejected from the mobile phone 103 to the reception. Inside the pharmacy, after preparing medicine to be supplied to the user 104, the pharmacist 105 installs the secure memory card 101 to a PC 102 and writes the medication instruction of the medicine on the secure memory card 101 using the PC 102. Then, the medicine and the secure memory card 101 are given to the user 104. The user 104 installs the secure memory card 101 to the mobile phone 103 and browses the medication instruction on a screen of the mobile phone 103.

FIG. 2 shows a configuration of the secure memory card 101 and the PC 102 of the system according to the present embodiment. Further, FIG. 3 shows a configuration of the secure memory card 101 and the mobile phone 103 of the system according to the present embodiment. The present system includes the secure memory card 101, the PC 102 for writing information readable only by the user 104 who owns the secure memory card 101 on the secure memory card 101, and the mobile phone 103 for reading the information from the secure memory card 101 and displaying.

The secure memory card 101 includes a card private key storing unit 208 for storing a private key in a public key encryption system such as RSA (Rivest Shamir Adleman) and an elliptic cryptosystem, etc., a card common key receiving unit 242 for receiving a common key from the mobile phone 103, a common key decrypting unit 235 for decrypting the common key using the private key stored by the card private key storing unit 208, a card common key sending unit 209 for sending the decrypted common key to the mobile phone 103, a card certificate storing unit 202 which stores a certificate of a public key that forms a pair with the private key and from which deletion is impossible but reading is possible without authentication, a certificate sending unit 201 for sending the certificate to the PC 102, an authentication data storing unit 205 for storing a PIN that only a secure memory card owner knows, an authentication data receiving unit 207 for receiving the PIN input by the mobile phone 103, an authenticating unit 206 for checking the PIN, a private storing unit 203 which is readable/writable from the outside only when a correct PIN is input, a card data receiving unit 204 for receiving data from the mobile phone 103, a public storing unit 210 which is readable/writable from the outside without checking a PIN, a confidential data receiving unit 211 for receiving confidential data from the PC 102, and a card data sending unit 212 for sending data to the mobile phone 103.

Here, the confidential data is, for example, EnvelopedData disclosed in RFC-2630 ("Cryptographic Message Syntax," IETF Network Working Group, R. Housley, RFC-2630, June 1999), and it is composed of encryption object data and an encrypted common key which is used for encrypting the encryption object data. In this embodiment, the encryption object data is signature data.

The signature data is, for example, SignedData disclosed in RFC-2630, and is composed of data which the user of the PC 102 is to send to the owner of the secure memory card 101 such as medication instruction, etc. and a digital signature and a certificate of the PC 102 or the user of the PC 102.

The PC 102 which writes data readable only by the user 104 on the secure memory card 101 includes an inputting unit 213 for receiving inputs from a user such as the pharmacist 105, a data storing unit 215 for storing the input data, etc., a certificate receiving unit 214 for receiving a certificate from the secure memory card 101, a card certificate verifying unit 216 for verifying validity of the certificate, a system private key storing unit 218 for storing a private key in a public key cryptosystem such as RSA and the elliptic cryptosystem, etc., a system certificate storing unit 217 for storing a certificate of a public key which forms a pair with the private key, a digital signature generating unit 220 for generating a digital signature, a signature data generating unit 219 for generating signature data using the data stored by the data storing unit 215, the certificate stored by the system certificate storing unit 217 and the digital signature generated by the digital signature generating unit 220, a signature data encrypting unit 222 for encrypting the signature data, a common key generating unit 221 for generating a common key, a common key encrypting unit 223 for encrypting the common key, a confidential data generating unit 224 for generating confidential data using the signature data and the common key that are encrypted, and a confidential data sending unit 225 for sending the confidential data to the secure memory card 101. Each unit having encrypting function carries out encryption/decryption of the common key cryptosystem or the public key cryptosystem, hashing operation, random number generation, etc. Further, not shown in the figure, in the present embodiment, the PC 102 has a display unit such as a liquid crystal display (LCD), etc.

The mobile phone 103 owned by the user 104 includes a reading apparatus data sending unit 226 for sending data to the secure memory card 101, a reading apparatus data receiving unit 239 for receiving data from the secure memory card 101, a common key obtaining unit 237 for obtaining a common key included in confidential data received from the secure memory card 101, a reading apparatus common key sending unit 241 for sending the common key to the secure memory card 101, a reading apparatus common key receiving unit 233 for receiving a common key decrypted by the secure memory card 101 from the secure memory card 101, a signature data obtaining unit 240 for obtaining signature data included in the confidential data received from the secure memory card 101, a signature data decrypting unit 238 for decrypting the signature data, a data obtaining unit 227 for obtaining data such as medication instruction, etc. from the decrypted signature data, a digital signature obtaining unit 232 for obtaining a digital signature from the decrypted signature data, a digital signature verifying unit 231 for verifying validity of the digital signature, a certificate obtaining unit 236 for obtaining a certificate from the decrypted signature data, a system certificate verifying unit 234 for verifying validity of the certificate, an operating unit 228 such as dial buttons, etc. for receiving inputs from the user 104, an outputting unit 229 such as a liquid crystal display (LCD), etc. for supplying interface to the user 104, and an authentication data sending unit 230 for sending a PIN to the secure memory card 101. Each unit having decrypting function carries out encryption/decryption of the common key cryptosystem or the public key cryptosystem, hashing operation, random number generation, etc.

FIG. 4 is a sequence diagram showing processes in which the pharmacist 105 writes medication instruction readable only by the user 104 on the secure memory card 101 using the PC 102 placed at the pharmacy without inputting a PIN. Further, FIG. 5 is a flowchart showing the same processes.

Before the above process, on specifying the medication instruction to be issued to the user 104 using the PC 102, the pharmacist 105 installs the secure memory card 101 to the PC 102 placed at the pharmacy. Then, the pharmacist instructs the PC 102 to issue the medication instruction from the inputting unit 213 of the PC 102. The data storing unit 215 of the PC 102 stores the input data of the medication instruction. The subsequent processing flow will be explained in the following.

The PC 102 sends a request to obtain a certificate to the secure memory card 101. Receiving the request to obtain the certificate, the certificate sending unit 201 of the secure memory card 101 reads a certificate of the user 104 from the card certificate storing unit 202 and sends to the PC 102. The certificate receiving unit 214 of the PC 102 receives the certificate (S501).

The card certificate verifying unit 216 verifies the obtained certificate of the user 104 (a user certificate, hereinafter) (S502). The card certificate verifying unit 216 holds certificates and a certificate revocation list (CRL) issued by a reliable certificate authority (CA) and uses to verify the certificate. In the process of verifying the user certificate, it is also possible to obtain a certificate and a CRL issued by a CA from the outside through communication.

When the validity of the user certificate is not confirmed (verification result is NG), the process terminates. When the validity of the user certificate is confirmed (verification result is OK), the digital signature generating unit 220 generates a digital signature for the medication instruction using a private key to be stored by the system private key storing unit 218. Then, the medication instruction, the digital signature, and the certificate (a pharmacy certificate, hereinafter) to be stored by the system certificate storing unit 217 are combined by the signature data generating unit 219 and the signature data is generated (S503).

Next, the common key generating unit 221 generates a common key at random. The signature data encrypting unit 222 encrypts the signature data using the common key. The common key encrypting unit 223 encrypts the common key using the public key included in the user certificate. Then, the confidential data generating unit 224 generates confidential data by combining the encrypted medication instruction and the encrypted common key (S504).

The confidential data is sent to the confidential data receiving unit 211 of the secure memory card 101 from the confidential data sending unit 225 of the PC 102. The secure memory card 101 writes the received confidential data in the public storing unit 210 as a file (S505). Its filename may be defined as, for example, "medication instruction 20040401," etc. from which the contents and the creation date can be easily understood. This writing process is a writing process on the public storing unit 210, so that an inputting operation of a PIN is unnecessary.

FIG. 6 is a sequence diagram showing processes in which the encrypted medication instruction written on the secure memory card 101 is browsed using the mobile phone 103 owned by the user 104. Further, FIG. 7 is a flowchart showing the same processes.

The user 104 who receives the secure memory card 101 at the pharmacy installs the secure memory card 101 to the mobile phone 103. The mobile phone 103 obtains a file list of the public storing unit 210 of the secure memory card 101 (S701).

The user 104 selects the medication instruction from the list using the operating unit 228. At this time, the file list can be displayed on the outputting unit 229 for the user 104. The secure memory card 101 which receives a request to obtain the selected file from the mobile phone 103 extracts the medication instruction which forms a file of the confidential data (confidential file) from the public storing unit 210 and sends from the card data sending unit 212. The reading apparatus data receiving unit 239 of the mobile phone 103 receives the confidential file (S702).

The mobile phone 103 decodes the read confidential data and the encrypted common key is obtained by the common key obtaining unit 237. Further, the signature data obtaining unit 240 obtains the signature data of the encrypted medication instruction using the common key. Then, the reading apparatus common key sending unit 241 sends the encrypted common key to the secure memory card 101. The secure memory card 101 receives the common key by the card common key receiving unit 242 and decrypts the common key by the common key decrypting unit 235 using the private key stored by the card private key storing unit 208. The decrypted common key is sent to the mobile phone 103 by the card common key sending unit 209. The mobile phone 103 receives the decrypted common key by the reading apparatus common key receiving unit 233. The signature data decrypting unit 238 decrypts the encrypted signature data of the medication instruction using the common key (S703).

The decrypted signature data is separated into the medication instruction, the digital signature, and the pharmacy certificate, and respectively transferred to the data obtaining unit 227, the digital signature obtaining unit 232, and the certificate obtaining unit 236. Then, the system certificate verifying unit 234 verifies the pharmacy certificate obtained by the certificate obtaining unit 236. The system certificate verifying unit 234 holds certificates and a CRL issued by a reliable CA and uses for verifying certificates. In the process of verifying the pharmacy certificate, it is also possible to obtain certificates and a CRL issued by a CA from the outside through communication. When the validity of the pharmacy certificate is confirmed, the digital signature verifying unit 231 verifies the validity of the digital signature using the medication instruction, the public key included in the pharmacy certificate and the digital signature (S704).

When the validity of the digital signature is not confirmed (verification result is NG), the process terminates. When the validity of the digital signature is confirmed (verification result is OK), the medication instruction obtained by the data obtaining unit 227 is made browsable by the user 104 from the outputting unit 229 (S705).

When the medication instruction has been browsed, the mobile phone 103 sends a request to store the medication instruction in the private storing unit 203 to the secure memory card 101 (S706).

Then, the secure memory card 101 requests the mobile phone 103 to input a PIN. The user 104 inputs a PIN using the operating unit 228 (S707). At this time, for example, a PIN inputting window can be displayed on the outputting unit 229 to let the user 104 input the PIN in a predetermined field of the PIN inputting window. The inputted PIN is sent from the authentication data sending unit 230 of the mobile phone 103 to the authentication data receiving unit 207 of the secure memory card 101.

The authenticating unit 206 of the secure memory card 101 checks the PIN by comparing the received PIN with the PIN stored by the authentication data storing unit 205, and performs authentication. If the authentication fails (check result is NG), the process terminates. If the authentication succeeds (check result is OK), the reading apparatus data sending unit 226 of the mobile phone 103 sends the file of the medication instruction to the secure memory card 101. The card data receiving unit 204 of the secure memory card 101 receives the file and stores in the private storing unit 203 (S708). Afterwards, the encrypted medication instruction in the public storing unit 210 can be deleted.

As discussed above, in the present embodiment, the pharmacist 105 does not need to input the PIN of the secure memory card 101 on writing the medication instruction on the secure memory card 101, and thus the pharmacist 105 does not need to ask the user 104 who knows the PIN to input the PIN. Further, since the medication instruction is formed as the signature data to which the digital signature of the pharmacy is added, it is possible to confirm that the medication instruction has not been falsified and that the medication instruction is composed by the pharmacy with verification of the signature data by the mobile phone 103. Further, since the signature data including the medication instruction is encrypted so that the signature data can be decrypted only by the user 104 who is an owner of the secure memory card 101, a person other than the owner of the secure memory card 101 can never sneak a look at the medication instruction. Then, when rebrowsing of the medication instruction is desired, only inputting/checking process of the PIN is necessary, and encryption process such as decryption, verification of the signature, etc. is unnecessary.

Embodiment 2

FIG. 8 shows a configuration of a system according to the present embodiment. In this embodiment, the data obtaining unit 227, the digital signature verifying unit 231, the digital signature obtaining unit 232, the system certificate verifying unit 234, the common key decrypting unit 235, the certificate obtaining unit 236, the common key obtaining unit 237, the signature data decrypting unit 238, the signature data obtaining unit 240 of the mobile phone 103 in the first embodiment are moved to the secure memory card 101. A configuration of the PC 102 that writes data on the secure memory card 101, which is omitted in FIG. 8, is the same as the first embodiment (FIG. 2).

A flow of processes in which the PC 102 writes the medication instruction on the secure memory card 101 is the same as the first embodiment (FIGS. 4 and 5).

FIG. 9 is a sequence diagram showing processes in which the encrypted medication instruction written on the secure memory card 101 is browsed using the mobile phone 103 owned by the user 104. Further, FIG. 10 is a flowchart showing the same processes.

The user 104 who receives the secure memory card 101 at a pharmacy installs the secure memory card 101 to the mobile phone 103. The secure memory card 101 confirms if a confidential file of a medication instruction is in the public storing unit 210 (S1001).

If a confidential file exists, the secure memory card 101 decrypts/verifies the confidential file of the public storing unit 210, and sends the mobile phone 103 a request for approval to move to the private storing unit 203. The mobile phone 103 displays this request for approval on the outputting unit 229. When the user 104 gives his/her intention to approve through the operating unit 228, a notification of approval is sent from the mobile phone 103 to the secure memory card 101. Obtaining the notification of approval, the secure memory card 101 decodes the confidential file and obtains an encrypted common key by the common key obtaining unit 237. Further, signature data of the medication instruction encrypted with the common key is obtained by the signature data obtaining unit 240. Then, the common key decrypting unit 235 decrypts the common key using a private key of the secure memory card 101. Here, as the private key of the secure memory card 101, the one stored in the card private key storing unit 208 is used. The signature data decrypting unit 238 decrypts the encrypted signature data of the medication instruction using the decrypted common key (S1002).

The decrypted signature data is separated to the medication instruction, a digital signature, and a pharmacy certificate, which are transferred to the data obtaining unit 227, the digital signature obtaining unit 232, and the certificate obtaining unit 236, respectively. Then, the system certificate verifying unit 234 verifies the pharmacy certificate obtained by the certificate obtaining unit 236. The system certificate verifying unit 234 holds certificates and a CRL issued by a reliable CA and uses for verification of certificates. It is also possible that a CA communicating unit, not shown in the figure, is included in the secure memory card 101, and the CA communicating unit obtains certificates and a CRL issued by a CA from the outside through communication in a verification process of the pharmacy certificate. When the validity of the pharmacy certificate is confirmed, the digital signature verifying unit 231 verifies the validity of the digital signature using the medication instruction, the public key included in the pharmacy certificate, and the digital signature (S1003).

When the validity of the digital signature cannot be confirmed (verification result is NG), the process terminates. When the validity of the digital signature is confirmed (verification result is OK), the medication instruction obtained by the data obtaining unit 227 is copied in the private storing unit 203 (S1004).

After the medication instruction has been copied, the secure memory card 101 deletes the confidential file of the medication instruction from the public storing unit 210 (S1005).

The mobile phone 103 requests for a file list of the private storing unit 203 of the secure memory card 101 (S1006).

Then, the secure memory card 101 requests the mobile phone 103 to input a PIN. The user 104 inputs a PIN using the operating unit 228 (S1007). At this time, for example, a PIN inputting window can be displayed on the outputting unit 229 to let the user 104 input the PIN in a predetermined field of the PIN inputting window. The inputted PIN is sent from the authentication data sending unit 230 of the mobile phone 103 to the authentication data receiving unit 207 of the secure memory card 101.

The authenticating unit 206 of the secure memory card 101 checks the PIN by comparing the received PIN with the PIN stored by the authentication data storing unit 205, and performs authentication. If the authentication fails (check result is NG), the process terminates. If the authentication succeeds (check result is OK), the card data sending unit 212 of the secure memory card 101 sends a file list to the mobile phone 103. The reading apparatus data receiving unit 239 of the mobile phone 103 receives the file list and outputs to the outputting unit 229 (S1008).

This file list includes the file of the medication instruction which has already been moved from the public storing unit 210 to the private storing unit 203. When the user 104 selects this file by the operating unit 228, the card data sending unit 212 of the secure memory card 101 sends the file of the medication instruction to the mobile phone 103. The reading apparatus data receiving unit 239 of the mobile phone 103 receives the file, outputs to the outputting unit 229, and the user 104 is able to browse the medication instruction (S1009).

As described above, in the present embodiment, it is possible for the secure memory card 101 to confirm, by decrypting the confidential data and using the digital signature and the certificate included in the confidential data, the validity of the data of the medication instruction which is included as well in the confidential data. Accordingly, it is not necessary to previously implement these functions on the mobile phone 103.

In the first and the second embodiments, only the user 104 who is an owner of the secure memory card 101 can browse the data of the medication instruction, however, it is also possible that plural users use the same secure memory card 101.

Further, in the first and the second embodiments, an example has been used in which the PC 102 of the pharmacy writes the data of the medication instruction on the secure memory card 101, however, the present invention is also applicable to a case in which a writing apparatus having similar function located at a different place writes a different kind of data on the secure memory card 101.

In this way, the secure memory card system that has been explained in the first embodiment, being a memory card system in which data is written on a memory card or an IC card and the written data is browsed by a card owner, the secure memory card system characterized to have:

a secure memory card including a public storing area in which the memory card can write the data without authentication, a private storing area in which reading/writing can be done only when PIN authentication succeeds, a certificate storing area which stores a certificate of the card owner, in which writing is not allowed, but from which reading can be done without authentication, a private key storing area which stores a private key of a card user, a PIN storing area which stores a PIN that only the card user knows, and a controlling unit which controls requests for processing from the outside to the card, event notification to the outside, and an internal processing by accessing information of each storing area;

a card data writing apparatus including a private key storing unit, a certificate storing unit, and an encryption format processing unit for generating signature data and confidential data, a certificate verifying unit for verifying an obtained certificate, and an encrypting unit having encrypting function necessary for generation of the signature data and the confidential data, and verification of the certificate; and a card data browsing apparatus including a certificate verifying unit, an encryption format processing unit, and an encrypting unit for decrypting the confidential data and verifying the signature data.

Further, the secure memory card system that has been explained in the second embodiment, being a memory card system in which data is written on a memory card or an IC card and the written data is browsed by a card owner, the secure memory card system characterized to have:

a secure memory card including a public storing area in which the memory card can write the data without authentication, a private storing area in which reading/writing can be done only when PIN authentication succeeds, a certificate storing area which stores a certificate of the card owner, in which writing is not allowed, but from which reading can be done without authentication, a private key storing area which stores a private key of a card user, a PIN storing area which stores a PIN that only the card user knows, a certificate storing unit, an encryption format processing unit, an encrypting unit for decrypting the confidential data and verifying the signature data, and a controlling unit which controls requests for processing from the outside to the card, event notification to the outside, and an internal processing by accessing information of each storing area;

a card data writing apparatus including a private key storing unit, a certificate storing unit, and an encryption format processing unit for generating signature data and confidential data; a certificate verifying unit for verifying an obtained certificate, and an encrypting unit having encrypting function necessary for generation of the signature data and the confidential data, and verification of the certificate; and a card data browsing apparatus for reading the data from the secure memory card and displaying.

In each of the foregoing embodiments, the secure memory card 101, the PC 102, and the mobile phone 103 can be implemented by a computer.

The secure memory card 101, the PC 102, and the mobile phone 103 include a CPU (Central Processing Unit) executing programs, which is not shown in the figures. For example, the CPU is connected to a ROM (Read Only Memory), a RAM (Random Access Memory), a communication board, a display unit, a K/B (keyboard), a mouse, an FDD (Flexible Disk Drive), a CDD (compact disc drive), a magnetic disk drive, an optical disk drive, a printer device, a scanner device, etc. through a bus.

The RAM is an example of volatile memories. The ROM, the FDD, the CDD, the magnetic disk drive, and the optical disk drive are examples of non-volatile memories. These are examples of memory devices, memory units, or storing units.

The data or information handled by the secure memory card 101, the PC 102, and the mobile phone 103 in each of the above described embodiments is stored in memory devices, memory units, or storing units, and is recorded and read by each unit of the secure memory card 101, the PC 102, and the mobile phone 103.

Further, the communication board is connected to, for example, a LAN, the Internet, or a WAN (wide area network) such as ISDN.

An operating system (OS), a window system, a group of programs, and a group of files (database) are stored in the magnetic disk drive.

The group of programs is executed by the CPU, the OS, and the window system.

A part or whole of each process of the secure memory card 101, the PC 102, and the mobile phone 103 can be configured by programs operable on computers. Alternately, a part or whole of the each process can be also embodied by firmware stored in the ROM. Further, a part or whole of the each process can be also implemented by software, hardware, or a combination of software, hardware, and firmware.

The above group of programs stores programs to have the CPU implement the processes that have been explained as "-- unit" in the description of the embodiments. These programs are composed using computer languages such as C language, HTML, SGML, and XML, etc.

The above programs are stored in recording medium such as a magnetic disk drive, an FD (Flexible Disk), an optical disk, a CD (Compact Disc), an MD (Mini Disc), a DVD (Digital Versatile Disk), etc. and read and executed by the CPU.

EXPLANATION OF SIGNS

Figure 1:
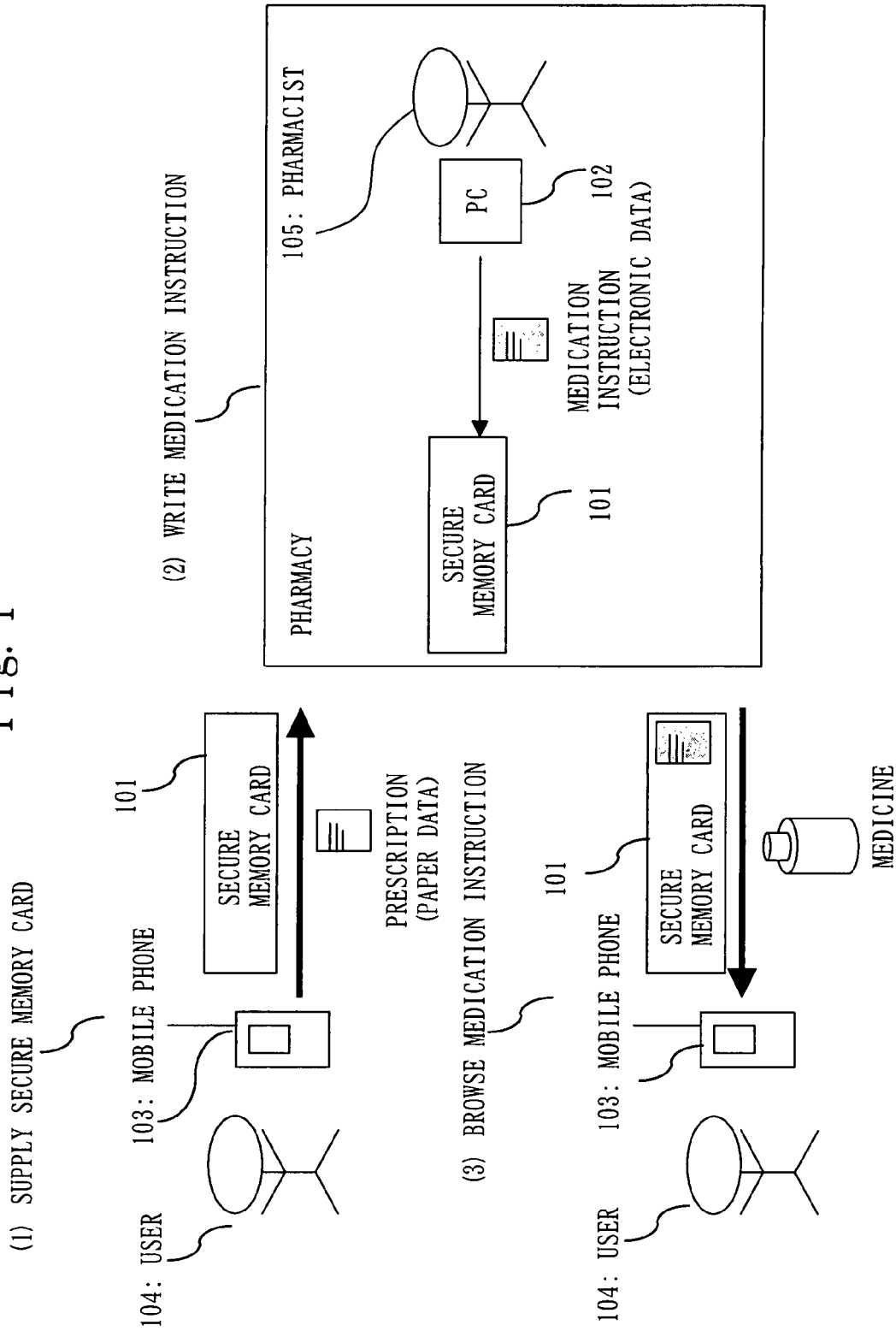
FIG. 1 is a conceptual diagram showing exchange between users in a data exchange system according to first and second embodiments.
Figure 2:
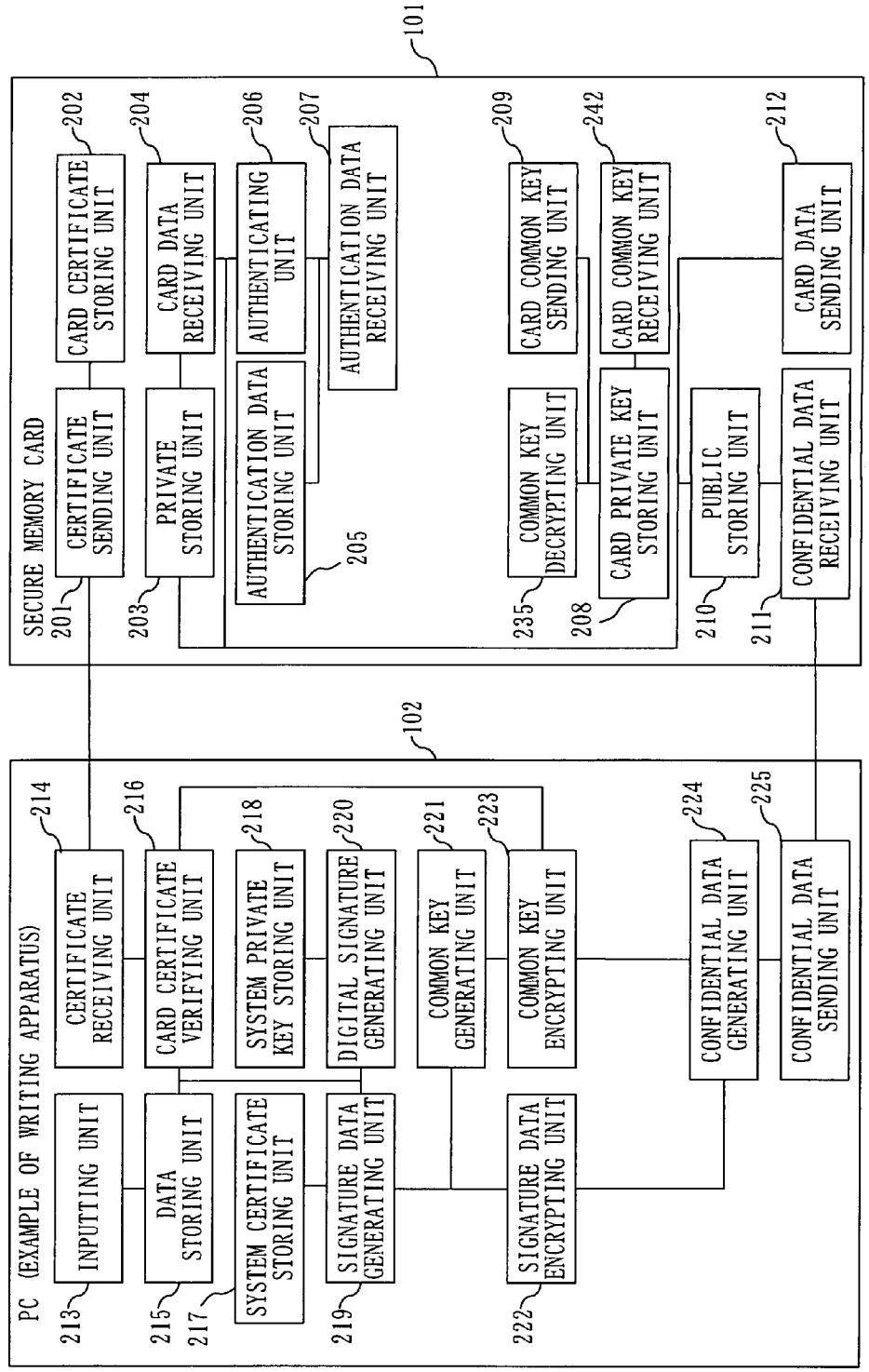
FIG. 2 is a block diagram showing a configuration of a writing apparatus and a memory card according to the first embodiment.
Figure 3:
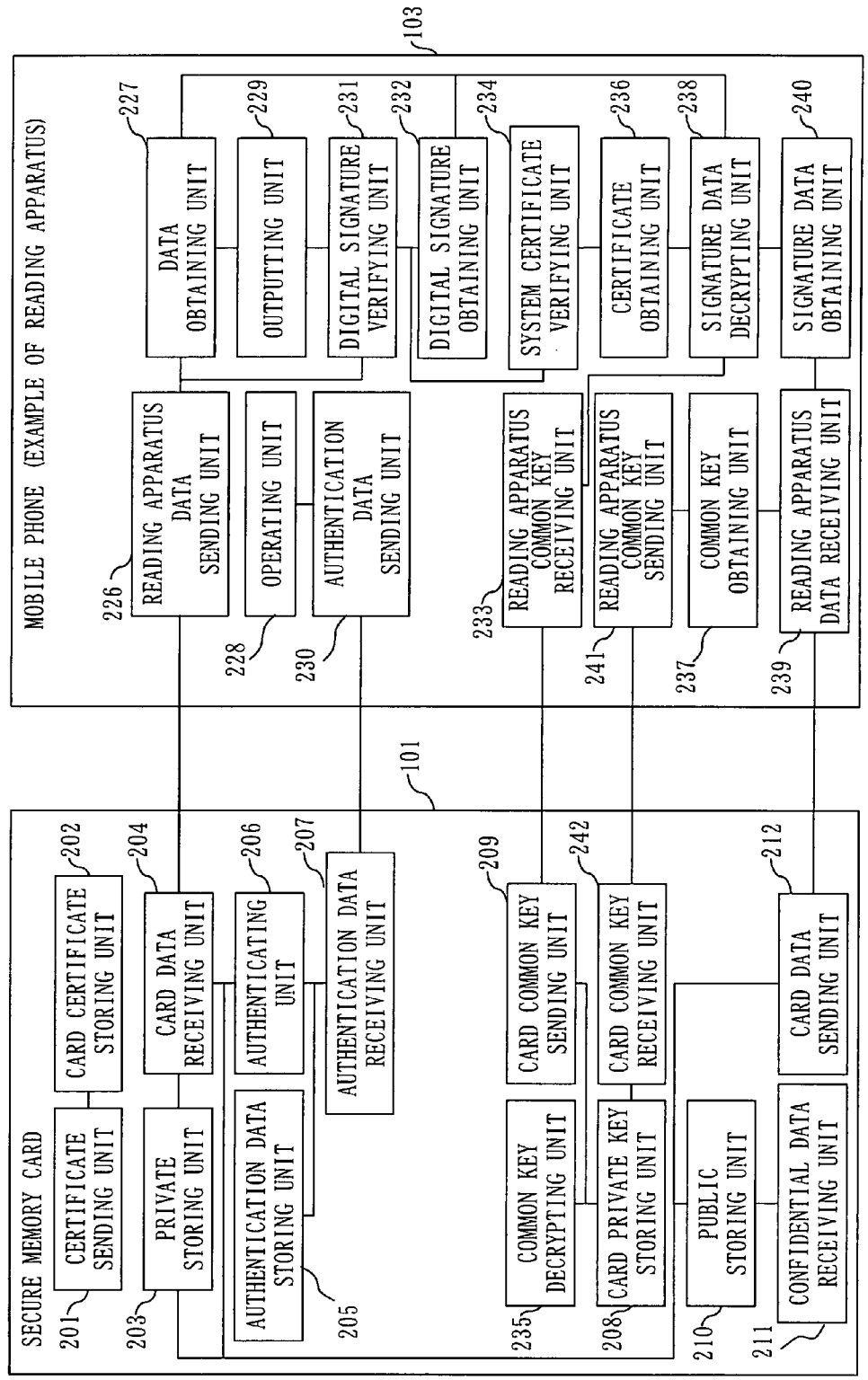
FIG. 3 is a block diagram showing a configuration of a memory card and a reading apparatus according to the first embodiment.
Figure 4:
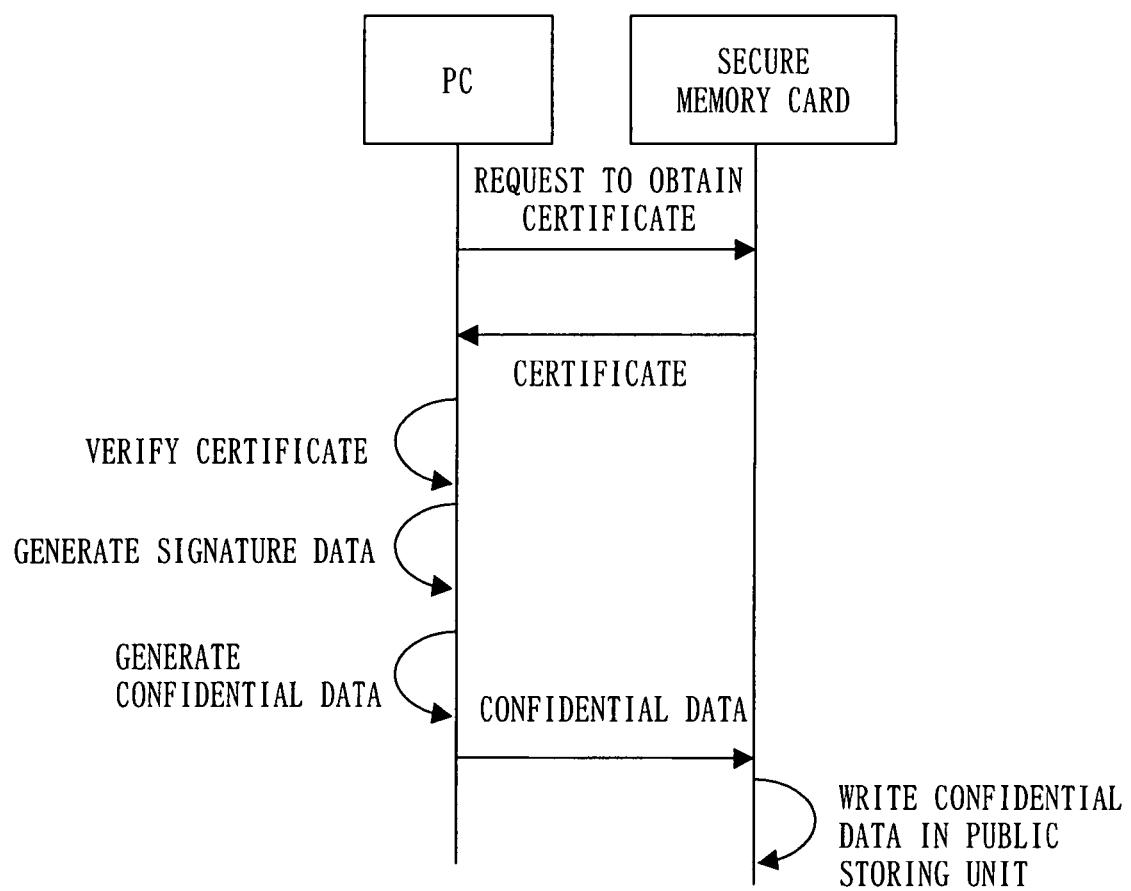
FIG. 4 is a sequence diagram showing processes performed by the writing apparatus and the memory card according to the first embodiment.
Figure 5:
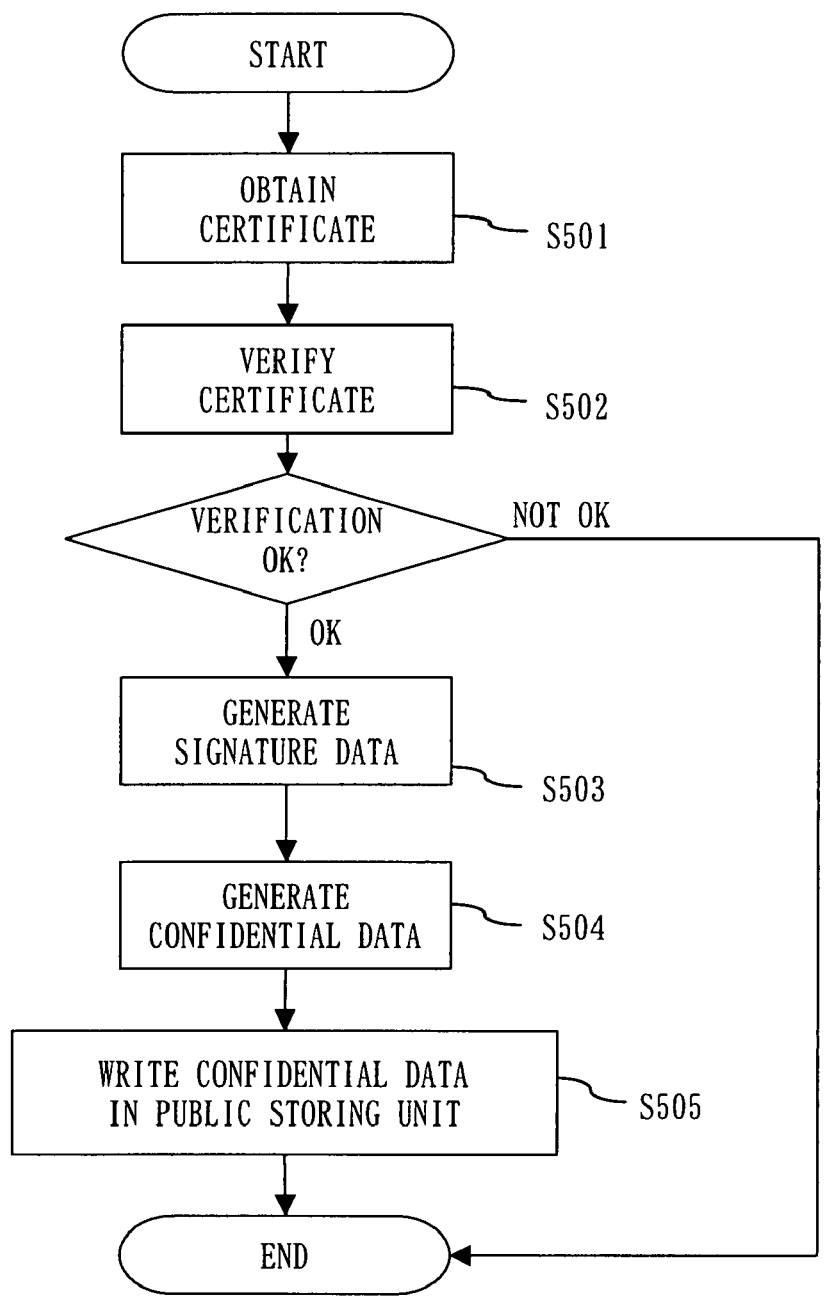
FIG. 5 is a flowchart showing processes performed by the writing apparatus and the memory card according to the first embodiment.
Figure 6:
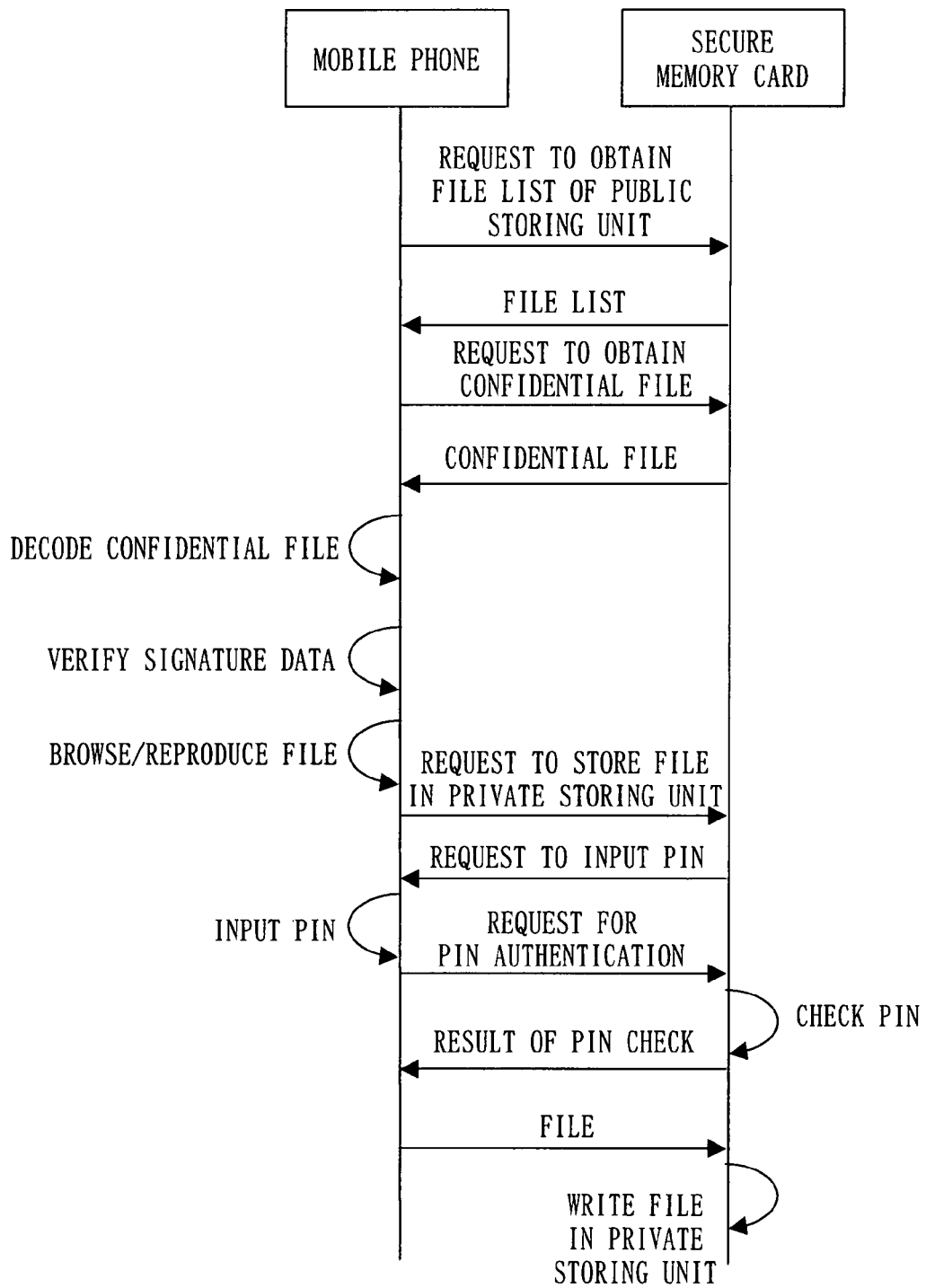
FIG. 6 is a sequence diagram showing processes performed by the memory card and the reading apparatus according to the first embodiment.
Figure 7:
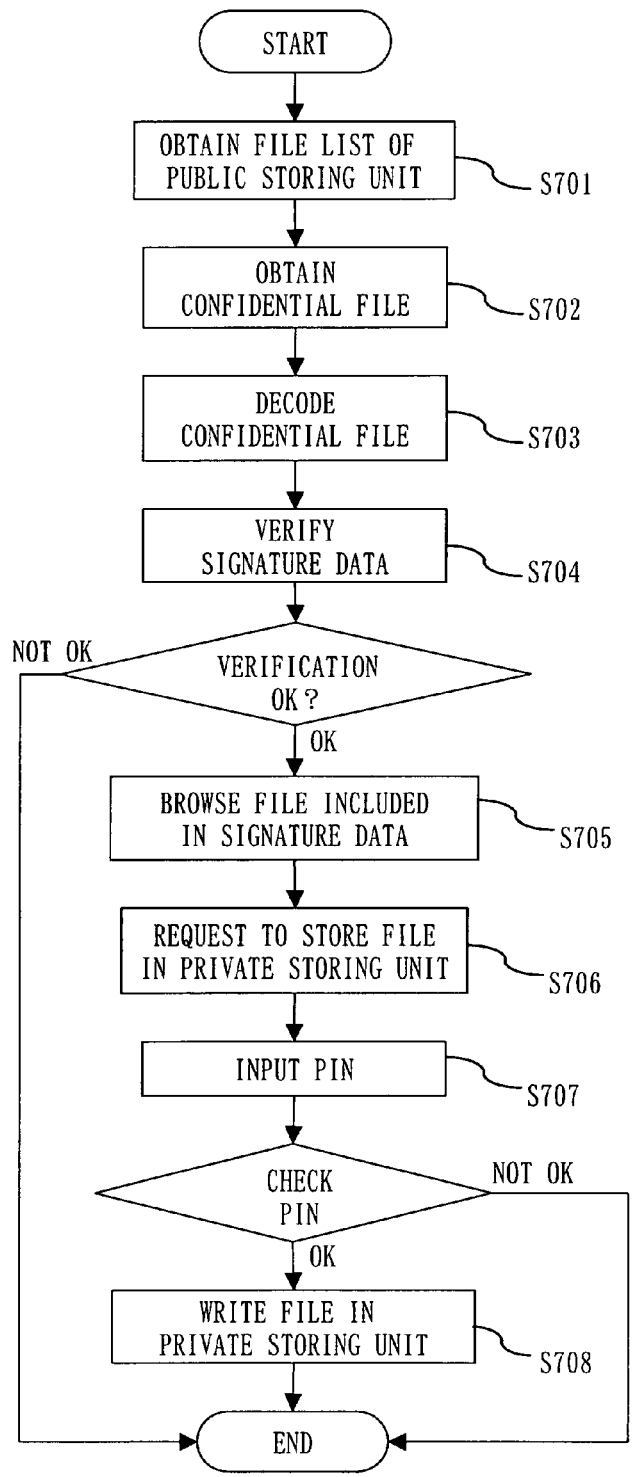
FIG. 7 is a flowchart showing processes performed by the memory card and the reading apparatus according to the first embodiment.
Figure 8:
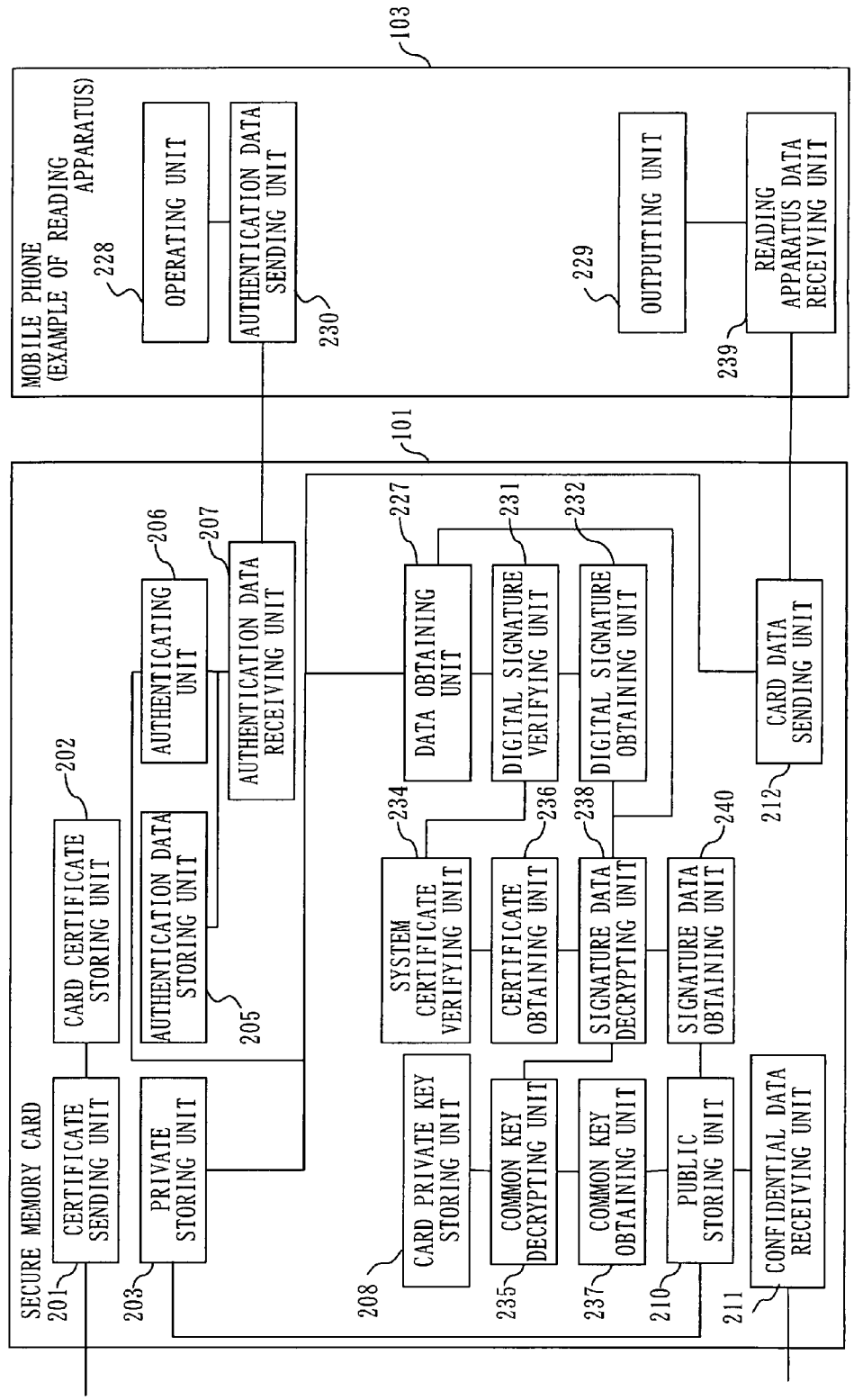
FIG. 8 is a block diagram showing a configuration of a memory card and a reading apparatus according to the first embodiment.
Figure 9:
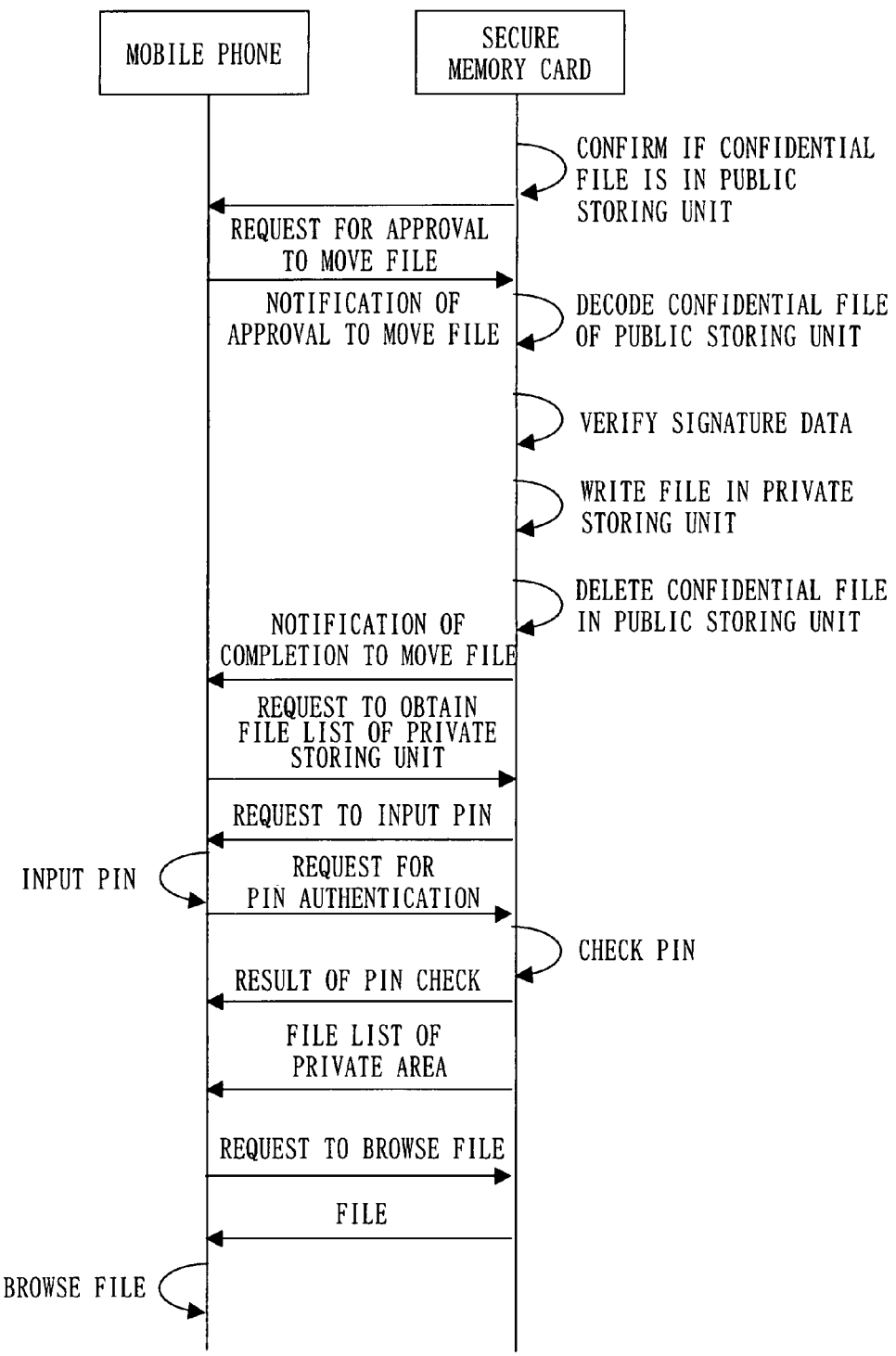
FIG. 9 is a sequence diagram showing processes performed by the memory card and the reading apparatus according to the first embodiment.
Figure 10:
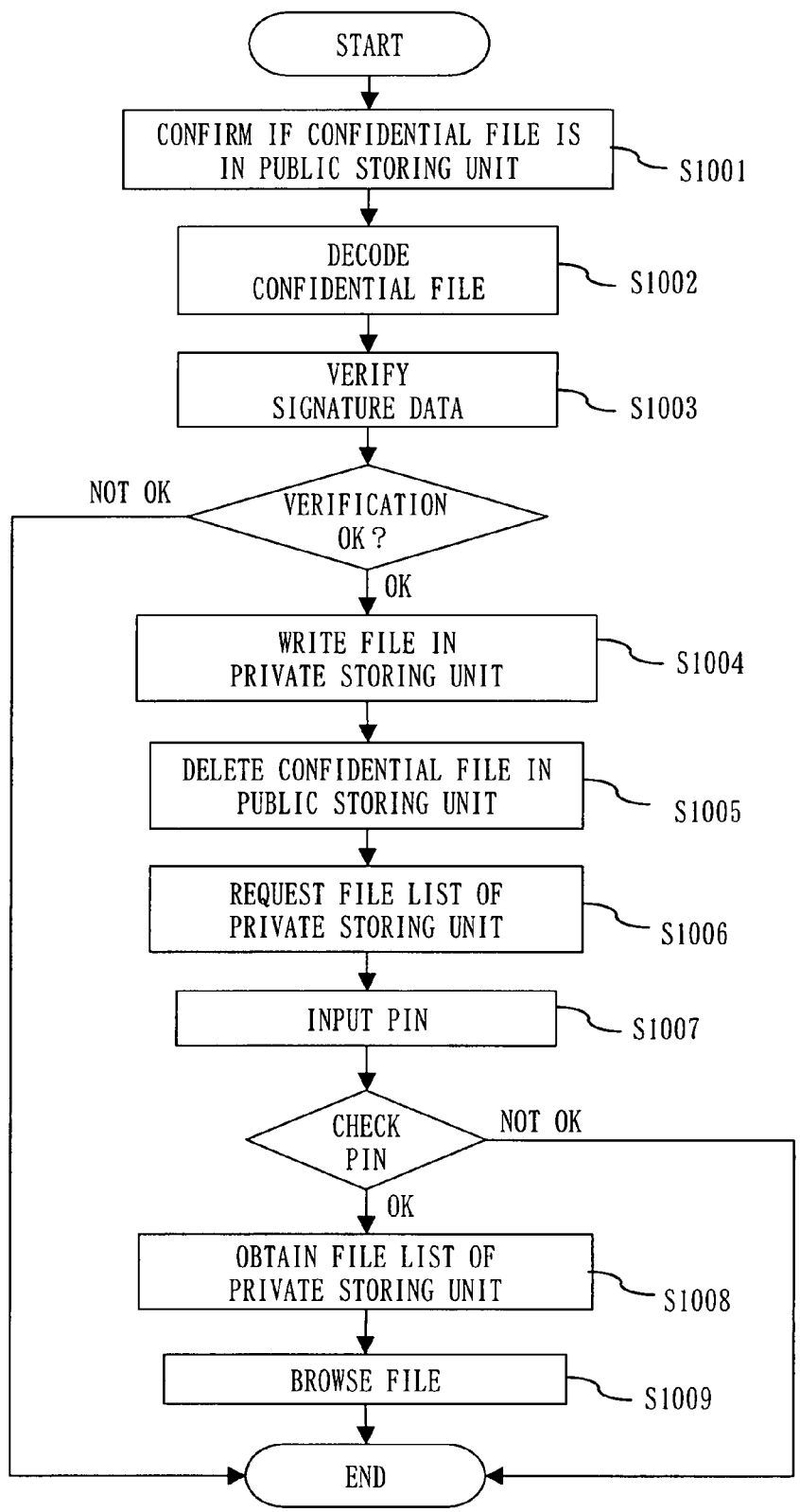
FIG. 10 is a flowchart showing processes performed by the memory card and the reading apparatus according to the first embodiment.

101: a secure memory card; 102: a PC; 103: a mobile phone; 104: a user; 105: a pharmacist; 201: a certificate sending unit; 202: a card certificate storing unit; 203: a private storing unit; 204: a card data receiving unit; 205: an authentication data storing unit; 206: an authenticating unit; 207: an authentication data receiving unit; 208: a card private key storing unit; 209: a card common key sending unit; 210: a public storing unit; 211: a confidential data receiving unit; 212: a card data sending unit; 213: an inputting unit; 214: a certificate receiving unit; 215: a data storing unit; 216: a card certificate verifying unit; 217: a system certificate storing unit; 218: a system private key storing unit; 219: a signature data generating unit; 220: a digital signature generating unit; 221: a common key generating unit; 222: a signature data encrypting unit; 223: a common key encrypting unit; 224: a confidential data generating unit; 225: a confidential data sending unit; 226: a reading apparatus data sending unit; 227: a data obtaining unit; 228: an operating unit; 229: an outputting unit; 230: an authentication data sending unit; 231: a digital signature verifying unit; 232: a digital signature obtaining unit; 233: a reading apparatus common key receiving unit; 234: a system certificate verifying unit; 235: a common key decrypting unit; 236: a certificate obtaining unit; 237: a common key obtaining unit; 238: a signature data decrypting unit; 239: a reading apparatus data receiving unit; 240: a signature data obtaining unit; 241: a reading apparatus common key sending unit; an a card common key receiving unit.

The invention claimed is:

1. A memory card adapted to receive data from a writing apparatus, to store the received, and to send the stored data to a reading apparatus, the memory card comprising:

a card certificate storing unit storing a certificate including a first public key;

a certificate sending unit sending the certificate stored by the card certificate storing unit to the writing apparatus;

a confidential data receiving unit receiving confidential data from the writing apparatus, the confidential data being a combination of a common key encrypted by the writing apparatus using the first public key included in the certificate sent from the certificate sending unit, and signature data, which includes data to be read by the reading apparatus, encrypted by the writing apparatus using the common key;

a public storing unit, which is readable and/or writable from outside without authentication, storing the confidential data received by the confidential data receiving unit;

a card private key storing unit storing a first private key which forms a pair with the first public key;

a common key obtaining unit obtaining the encrypted common key from the confidential data stored by the public storing unit;

a signature data obtaining unit obtaining the encrypted signature data from the confidential data stored by the public storing unit;

a common key decrypting unit decrypting the encrypted common key obtained by the common key obtaining unit using the first private key stored by the card private key storing unit;

a signature data decrypting unit decrypting the encrypted signature data obtained by the signature data obtaining unit using the common key decrypted by the common key decrypting unit;

an authentication data receiving unit receiving authentication data sent from the reading apparatus;

an authentication data storing unit storing proper authentication data that only an owner of the memory card knows;

an authenticating unit performing the authentication by comparing the authentication data received by the authentication data receiving unit with the proper authentication data stored by the authentication data storing unit;

a data obtaining unit obtaining the data to be read by the reading apparatus from the signature data decrypted by the signature data decrypting unit;

a private storing unit, which is readable and/or writable from outside only when authentication performed by the authentication unit succeeds, storing the data obtained by the data obtaining unit; and
a card data sending unit sending the data stored by the private storing unit to the reading apparatus when the authentication performed by the authenticating unit succeeds.

2. The memory card of claim 1, wherein
the signature data is a combination of the data to be read by the reading apparatus, a digital signature generated by the writing apparatus using the data to be read by the reading apparatus and a second private key, and a certificate including a second public key, which forms a pair with the second private key,
the memory card further comprising:
a digital signature obtaining unit obtaining the digital signature from the signature data decrypted by the signature data decrypting unit;
a certificate obtaining unit obtaining the certificate from the signature data decrypted by the signature data decrypting unit;
a system certificate verifying unit verifying the certificate obtained by the certificate obtaining unit and obtaining the second public key included in the certificate; and
a digital signature verifying unit verifying the digital signature obtained by the digital signature obtaining unit using the data obtained by the data obtaining unit and the second public key obtained by the system certificate verifying unit,
wherein the private storing unit stores the data obtained by the data obtaining unit when the digital signature verifying unit verified the digital signature.

3. A data exchange system having a writing apparatus for writing data, a reading apparatus for reading the data, and a memory card according to claim 1, which is adapted to receive the data from the writing apparatus, to store the received data, and to send the stored data to the reading apparatus,
wherein the writing apparatus comprises:
an inputting unit inputting the data;
a data storing unit storing the data input by the inputting unit;
a certificate receiving unit receiving the certificate sent from the certificate sending unit;
a card certificate verifying unit verifying the certificate received by the certificate receiving unit and obtaining the first public key included in the certificate;
a signature data generating unit generating signature data using the data stored by the data storing unit;
a common key generating unit generating a common key;
a signature data encrypting unit encrypting the signature data generated by the signature data generating unit using the common key generated by the common key generating unit;
a common key encrypting unit encrypting the common key generated by the common key generating unit using the first public key obtained by the card certificate verifying unit;
a confidential data generating unit generating confidential data by combing the signature data encrypted by the signature encrypting unit and the common key encrypted by the common key encrypting unit; and
a confidential data sending unit sending the confidential data generated by the confidential data generating unit to the confidential data receiving unit, and
wherein the reading apparatus comprises:
an operating unit inputting authentication data;
an authentication data sending unit sending the authentication data input by the operating unit to the authentication data receiving unit;
a reading apparatus data receiving unit receiving the data sent from the card data sending unit; and
an outputting unit outputting the data received by the reading apparatus data receiving unit.

4. The memory card of claim 2 further comprising:
a CA communicating unit obtaining a certificate from a certificate authority (CA) which issues a certificate,
wherein the system certificate verifying unit verifies the certificate obtained by the certificate obtaining unit based on the certificate obtained by the CA communicating unit.

5. A data exchange system having a writing apparatus for writing data, a reading apparatus for reading the data, and a memory card according to claim 2, which is adapted to receive the data from the writing apparatus, to store the received data, and to send the stored data to the reading apparatus,
wherein the writing apparatus comprises:
an inputting unit inputting the data;
a data storing unit storing the data input by the inputting unit;
a certificate receiving unit receiving the certificate sent from the certificate sending unit;
a card certificate verifying unit verifying the certificate received by the certificate receiving unit and obtaining the first public key included in the certificate;
a system private key storing unit storing a second private key;
a digital signature generating unit generating a digital signature using the data stored by the data storing unit and the second private key stored by the system private key storing unit;
a system certificate storing unit storing a certificate including a second public key which forms a pair with the second private key;
a signature data generating unit generating signature data by combining the data stored by the data storing unit, the digital signature generated by the digital signature generating unit, and the certificate stored by the system certificate storing unit;
a common key generating unit generating a common key;
a signature data encrypting unit encrypting the signature data generated by the signature data generating unit using the common key generated by the common key generating unit;
a common key encrypting unit encrypting the common key generated by the common key generating unit using the first public key obtained by the card certificate verifying unit;
a confidential data generating unit generating confidential data by combining the signature data encrypted by the signature encrypting unit and the common key encrypted by the common key encrypting unit; and
a confidential data sending unit sending the confidential data generated by the confidential data generating unit to the confidential data receiving unit, and
wherein the reading apparatus comprises:
an operating unit inputting authentication data;
an authentication data sending unit sending the authentication data input by the operating unit to the authentication data receiving unit;
a reading apparatus data receiving unit receiving the data sent from the card data sending unit; and an outputting unit outputting the data received by the reading apparatus data receiving unit.

6. The memory card of claim 4 wherein
the authentication data storing unit stores a correct personal identification number (PIN) as the proper authentication data.

7. A data exchange method in which a memory card receives data from a writing apparatus, stores the data received, and sends the data stored to a reading apparatus, the data exchange method comprising:
by the memory card:
receiving confidential data which is generated by encrypting the data by the writing apparatus from the writing apparatus;
storing the confidential data received in a public storing unit;
sending the confidential data stored in the public storing unit to the reading apparatus;
receiving data which is obtained by the reading apparatus by decrypting the confidential data sent, from the reading apparatus;
receiving authentication data sent by the reading apparatus;
performing authentication by comparing the authentication data received with the proper authentication data stored in the memory card and only known to an owner of the memory card;
when the authentication succeeds, storing the data received from the reading apparatus in a private storing unit;
storing a certificate including a first public key;
sending the certificate stored to the writing apparatus;
storing a first private key which forms a pair with the first public key;
receiving a common key encrypted sent by the reading apparatus;
decrypting the common key received using the first private key stored;
sending the common key decrypted to the reading apparatus, by the writing apparatus:
receiving the certificate sent by the memory card;
verifying the certificate received and obtaining the first public key included in the certificate;
storing a second private key;
generating a digital signature using the data and the second private key stored;
storing a certificate including a second public key which forms a pair with the second private key;
generating signature data using the data stored, the digital signature generated, and the certificate including the second public key stored;
generating a common key;
encrypting the signature data generated using the common key generated;
encrypting the common key generated using the first public key obtained;
generating confidential data using the signature data and the common key encrypted, by the writing apparatus:
inputting data;
storing the data input;
generating confidential data by encrypting the data stored;
sending the confidential data generated to the memory card, by the reading apparatus:
receiving the confidential data sent by the memory card;
obtaining data by decrypting the confidential data received;
outputting the data obtained;
sending the data obtained to the memory card;
inputting authentication data;
sending the authentication data input to the memory card;
obtaining the signature data encrypted from the confidential data received;
obtaining the common key encrypted from the confidential data received;
sending the common key encrypted obtained to the memory card;
receiving the common key decrypted sent by the memory card;
decrypting the signature data obtained using the common key received;
obtaining the data from the signature data decrypted;
obtaining the digital signature from the signature data decrypted;
obtaining the certificate from the signature data decrypted;
verifying the certificate obtained and obtaining the second public key included in the certificate;
verifying the digital signature obtained using the data and the second public key obtained; and
outputting the data obtained based on a result of verification.

8. A data exchange method in which a memory card receives data from a writing apparatus, storing the data received, and sending the data stored to a reading apparatus, the data exchange method comprising:
by the memory card:
receiving confidential data which is generated by encrypting the data by the writing apparatus from the writing apparatus;
storing the confidential data received in a public storing unit;
obtaining the data by decrypting the confidential data stored in the public storing unit;
storing the data obtained in a private storing unit;
receiving authentication data sent by the reading apparatus;
performing authentication by comparing the authentication data received with proper authentication data stored in the memory card and only known to an owner of the memory card;
when the authentication succeeds, sending the data stored to the reading apparatus;
storing a certificate including a first public key;
sending the certificate stored to the writing apparatus;
storing a first private key which forms a pair with the first public key;
obtaining the data from the signature data decrypted;
obtaining signature data encrypted from the confidential data stored;
obtaining a common key encrypted from the confidential data stored;
decrypting the common key obtained using the first private key stored;
decrypting the signature data obtained using the common key decrypted;
obtaining a digital signature from the signature data decrypted;
obtaining a certificate including a second public key from the signature data decrypted;
verifying the certificate obtained and obtaining the second public key included in the certificate;
verifying the digital signature obtained using the data and the second public key obtained, by the writing apparatus:

inputting data;

storing the data input;

generating confidential data by encrypting the data stored;

sending the confidential data generated to the memory card;

receiving the certificate sent by the memory card;

verifying the certificate received and obtaining the first public key included in the certificate;

storing a second private key;

generating a digital signature using the data and the second private key stored;

storing a certificate including a second public key which forms a pair with the second private key;

generating signature data using the data stored, the digital signature generated, and the certificate including the second public key stored;

generating a common key;

encrypting the signature data generated using the common key generated;

encrypting the common key generated using the first public key obtained;

generating confidential data using the signature data and the common key encrypted, by the reading apparatus:

inputting authentication data;

sending the authentication data input to the memory card;

receiving the data sent by the memory card; and outputting the data received.

\* \* \* \* \*